QUICK ASSEMBLING AND DISASSEMBLING CIRCUIT SYSTEM

Filed Nov. 6, 1962

INVENTOR.
LEWIS S. BILLIG
BY Walter J. Kreske
ATTORNEY

United States Patent Office 3,257,584

Patented June 21, 1966

3,257,584

QUICK ASSEMBLING AND DISASSEMBLING CIRCUIT SYSTEM

Lewis S. Billig, Wayland, Mass., assignor to General Electronic Laboratories, Inc., Cambridge, Mass., a corporation of Massachusetts Filed Nov. 6, 1962, Ser. No. 235,667
3 Claims. (Cl. 317—101)

This invention relates to a system for making electric circuits and more particularly to a system for electric circuits having capacity for rapid manual and electrical attachment and detachment of circuit components arranged for mounting on a panel carrying a multiplicity of holes therein.

This invention is an improvement over the system for making electrical circuits described in application Serial No. 759,582, filed September 8, 1958 which issued as Patent No. 3,062,991 and a further system for making electric circuits described in Patent No. 2,878,587.

A primary object of the present invention is the provision of a system for making electric circuits with connections capable of operating in conjunction with and compatible with the systems described in the above mentioned Patent No. 2,878,587 and Patent No. 3,062,991.

Another object is the provision of a system for making electric circuits capable of rapid assembly and disassembly by hand alone with at least as much facility as achieved in Patent No. 2,878,587 and Patent No. 3,062,991 and having the added advantage of requiring a smaller number of components for any given circuit.

A still further object is the provision of a system for making electric circuits capable of rapid assembly and disassembly by hand alone which includes the versatility and advantages described in connection with Patent No. 2,878,587 and Patent No. 3,062,991 and having in addition thereto the advantages of being less expensive to manufacture as well as greater compactness of resulting circuit structures.

These and other objects, features and advantages of the present invention will become more apparent from the following description taken in connection with the accompanying drawings of a preferred embodiment of the invention and wherein.

Figure 1:
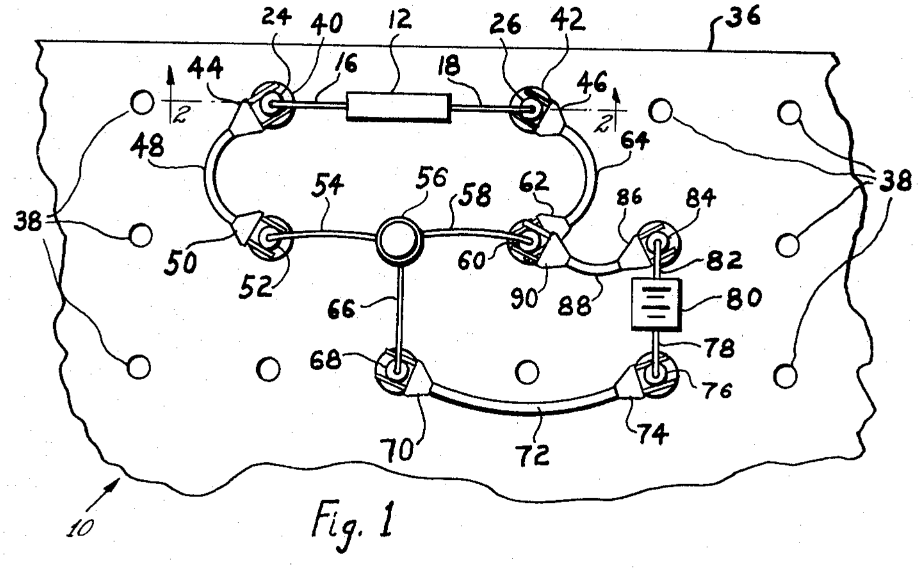
FIG. 1 is a top view of a circuit constructed and arranged on a portion of a panel in accordance with the present invention.
Figure 2:
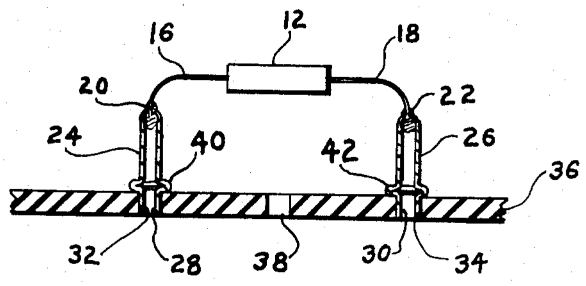
FIG. 2 is a cross sectional view taken on line 2—2 of FIG. 1 to more clearly show construction.

Referring to FIG. 1 in more detail, an electric circuit having capability for rapid coupling and decoupling of electric circuit components in accordance with the present invention is designated generally by the numeral 10. In the circuit 10, an electric circuit component 12 such as a resistor, capacitor, inductor or other desired electrical component, having electrically conductive elements or leads 16 and 18 is electrically and physically fastened as by solder connections 20 and 22 to terminal posts 24 and 26 respectively. The terminal posts 24 and 26 are of electrically conductive material such as brass or copper and preferably carry a protective coating as nickel, silver or the like. The terminal posts 24 and 26 have base portions 28 and 30 respectively slidably engaging holes 32 and 34 in a panel of dielectric material 36 carrying a multiplicity of holes 38 similar to the holes 32 and 34. Shoulders 40 and 42 about the periphery of the terminal posts 24 and 26 limit the travel in the holes 32 and 34 so that the upper body portion of the posts 24 and 26 may be suitably engaged by electrically conductive spring clips 44 and 46 which may be similar to the spring clips described in Patent No. 2,578,360 and Patent No. 3,062,991 or any other suitable rapidly attaching and detaching connector.

The spring clip 44 is electrically coupled to one end of an electrical connector line 48, the other end of which carries a similar spring clip 50 making engagement with another terminal post 52 similar to the terminal post 24 and carried in a hole 38 in the panel 36.

The terminal post 52 in the present instance is electrically and physically connected as by a solder connection with a lead 54 of an electrical component such as a transistor or vacuum tube 56 which also has a second lead 58 electrically and physically fixed as by soldering to a terminal post 60 similar to the terminal post 24 and slidably held in another hole 38 in the panel 36. The terminal post 60 also carries a spring clip 62 similar to the spring clip 44 and fixed to one end of a connector line 64, the other end of which is coupled to the spring clip 46.

A third electrical lead 66 from the transistor 56 is similarly electrically and physically fixed to a terminal post 68 which is similar to the terminal post 24 and held similarly in another hole 38 of the panel 36. Terminal post 68 has a spring clip 70, which may be similar to the spring clip 44, coupled to one end of an electrical connector line 72 the other end of which is fixed through a spring clip 74 to another terminal post 76. The terminal post 76 has a lead line 78 from a circuit component such as a battery 80 fastened in manner similar to that of the solder connection 20 and having a further lead line 82 fixed in similar manner to a terminal post 84 carrying a spring clip 86 similar to the spring clip 44. The spring clip 86 is on one end of an electrical connector line 88, the other end of which is coupled through a spring clip 90 to the terminal post 60.

In the operation of the present rapid assembling and disassembling circuit system, any of the spring clips 44, 46, 50, 62, 70, 74, 86 or 90 may be manually and rapidly inserted and removed laterally or vertically from the respective terminal post by hand alone, thereby facilitating circuit 10 assembly and disassembly. Each of the components 12, 56 and 80 carries permanently on its respective leads a terminal post such as the terminal post 24 so as to be readily arranged by hand alone and held in place by holes 38 on the panel 36 for further electrical connection by hand alone into a desired circuit 10 with such connectors as 48, 64 and 72, each carrying at its respective ends associated electrically conductive spring clips such as the spring clip 44.

What is claimed is:

1. Electrical apparatus having in combination a substantially flat panel having a plurality of holes, an electric circuit component having electrically conductive leads extending therefrom, a terminal post electrically and physically fastened to each of said leads and having base portions each with a periphery which is longitudinally straight sided in its entirety and dimensioned for sliding insertion in and removal from said holes by hand alone, each base portion engaging a respective hole in the panel for holding a portion of the terminal post beyond the surface of the panel and thereby the component in place on the panel with capacity and in readily accessible position for removal from said panel by hand alone, a shoulder on each terminal post intermediate said base portion and portion of the terminal post beyond the surface of said panel for limiting entry of said base portion in said hole, and flexible electrically conductive connectors having end-portions slidable onto and off the terminal posts by hand alone in gripping engagement with said terminal posts for providing electrical coupling therebetween.

2. The combination as in claim 1 wherein the lead and terminal post fastening is by a solder connection of the lead to the terminal post.

3. The combination as in claim 1 wherein said terminal posts are hollow with each having an opening at the extremity opposite its base portion and having securely fixed therein in electrical engagement with the terminal post a respective one of said component leads.

References Cited by the Examiner

UNITED STATES PATENTS

| | | | |
|---|---|---|---|
| 2,464,405 | 3/1949 | Knauf | 339—220 |
| 2,477,653 | 8/1949 | Roane | 317—101 |
| 2,533,483 | 12/1950 | Losquadro. | |
| 2,593,479 | 4/1952 | Nieter | 317—101 |
| 2,866,171 | 12/1958 | Wagner | 339—275 X |
| 2,878,587 | 2/1959 | Jubenville | 339—17 |
| 2,884,612 | 4/1959 | Bang | 339—275 X |
| 2,893,009 | 7/1959 | Bergsland et al. | |
| 2,915,678 | 12/1959 | Frazier et al. | 339—17 |
| 2,937,358 | 5/1960 | Bulger | 339—17 |
| 2,940,016 | 6/1960 | Flint et al. | 317—101 |
| 2,950,458 | 8/1960 | Artz | 339—17 X |
| 3,054,165 | 9/1962 | Braun et al. | |
| 3,062,991 | 11/1962 | Kaidan | 317—101 |
| 3,098,952 | 7/1963 | Mason | 317—101 |
| 3,123,664 | 3/1964 | Logan | 174—88 |
| 3,133,774 | 5/1964 | Bulk et al. | 339—17 |

ROBERT K. SCHAEFER, *Primary Examiner.*

JOHN F. BURNS, *Examiner.*

R. L. GABLE, S. H. BOYER, L. E. ASKIN, *Assistant Examiners.*